United States Patent
Neufeld et al.

(10) Patent No.: US 7,143,839 B2
(45) Date of Patent: Dec. 5, 2006

(54) HOLDER ASSEMBLY

(75) Inventors: George Neufeld, Saskatoon (CA); Phillip A. Reiber, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 10/932,178

(22) Filed: Sep. 1, 2004

(65) Prior Publication Data

US 2006/0042808 A1    Mar. 2, 2006

(51) Int. Cl.
A01B 15/14    (2006.01)
(52) U.S. Cl. .......................................... 172/776; 248/75
(58) Field of Classification Search ................ 172/776, 172/311; 248/49, 68.1, 75, 121, 200
See application file for complete search history.

(56) References Cited

U.S. PATENT DOCUMENTS

| | | | |
|---|---|---|---|
| 1,732,670 A | | 10/1929 | Wilmore |
| 2,177,128 A | * | 10/1939 | Johnson ....................... 138/110 |
| 2,879,020 A | * | 3/1959 | Wheeler ....................... 248/75 |
| 2,880,949 A | | 4/1959 | Fuss |
| 2,938,692 A | | 5/1960 | Bosworth et al. |
| 3,146,982 A | | 9/1964 | Budnick |
| 3,263,839 A | * | 8/1966 | Hauff .......................... 414/695 |
| 3,901,270 A | * | 8/1975 | Smith ........................... 137/351 |
| 4,111,268 A | * | 9/1978 | Frisbee ........................ 172/813 |
| 4,136,423 A | | 1/1979 | Sterling |
| 4,344,593 A | | 8/1982 | Canto |
| 4,417,711 A | | 11/1983 | Madej |
| 4,445,255 A | * | 5/1984 | Olejak .......................... 24/284 |
| 4,572,302 A | * | 2/1986 | Frisbee ........................ 172/813 |
| 4,646,395 A | | 3/1987 | Mayszak |
| 5,108,253 A | * | 4/1992 | Kobayashi et al. ......... 414/694 |
| 5,172,877 A | | 12/1992 | Hattori et al. |
| 5,488,996 A | * | 2/1996 | Barry et al. ................. 172/311 |
| 6,038,852 A | | 3/2000 | Celi |
| 6,378,279 B1 | * | 4/2002 | Smith et al. ................. 56/15.5 |
| 6,561,535 B1 | | 5/2003 | Paluch et al. |
| 6,572,057 B1 | * | 6/2003 | Roth ........................... 248/58 |
| 6,663,134 B1 | | 12/2003 | Paluch et al. |
| 2002/0076279 A1 | * | 6/2002 | Quenzi et al. .............. 404/100 |
| 2004/0031888 A1 | | 2/2004 | Bennett |

* cited by examiner

*Primary Examiner*—Victor Batson
(74) *Attorney, Agent, or Firm*—Rebecca Henkel

(57) ABSTRACT

A holder assembly is illustrated to support at least one flexible line extending along a telescoping tongue assembly of an agricultural implement. The holder assembly includes a first pivotally coupled link in general parallel alignment with a second pivotally coupled link, and at least one post pivotally interconnected between the first pivotally coupled link and the second pivotally coupled link. The holder assembly further includes a bracket connected at the post and configured to receive the at least one flexible line between the bracket and the post. As the telescoping tongue assembly moves between a retracted position and an extended position, the holder assembly enhances support of the flexible lines.

13 Claims, 7 Drawing Sheets

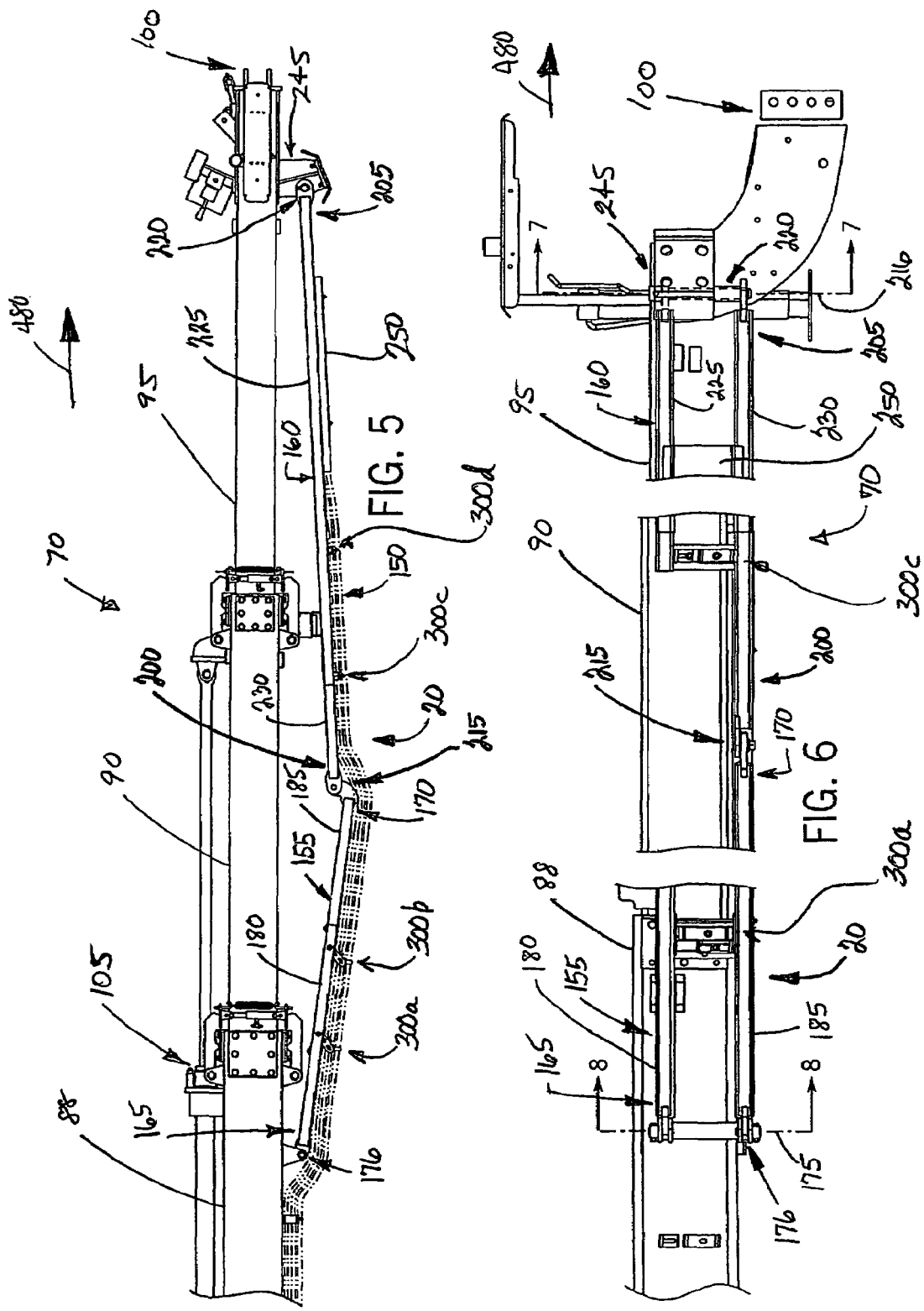

HOLDER ASSEMBLY

RELATED APPLICATIONS

This application relates to co-pending U.S. patent appilcation No. 10/932,176 entitled "Assembly For and Method of Constraining a Flexible Line of an Agricultural Implement," filed simultaneously with this application, and co-pending U.S. patent application No. 10/932,224 entitled "Support Assembly for a Flexible Line of an Agricultural Implement," filed simultaneously with this application, hereby incorporated herein by reference in their entirety.

FIELD OF INVENTION

The invention relates to a holder assembly for a plurality of flexible lines and, more particularly, to a holder assembly configured for a plurality of flexible lines associated with operation of an agricultural implement having a telescoping tongue assembly.

BACKGROUND OF INVENTION

Various types of agricultural implements have been developed that can be linked via an implement tongue assembly to a tractor hitch or other type of tow vehicle to facilitate different tasks including, for example, seeding, fertilizing and tilling. Hereinafter, unless indicated otherwise, the background of the invention and the present invention will be described in the context of an exemplary planting implement.

An important fact in accessing the value of a planting implement is how quickly the implement can accomplish the task of the implement. The task speed of the implement can be increased by reducing the number passes required to perform the implement's task for a field. Certain known planting implements are configured to expand to operating field widths of 40-feet or more. Unfortunately, such expansive widths cannot be tolerated during planter transportation, storage, and egress of the implements to and from many agricultural fields. In particular, many farmers use commercial roadways to transport their planting implements to and from the fields, and essentially all roadways are not designed to accommodate expansive planting implements. The industry has developed planting implements that are operable to fold to and from a retracted configuration between transport and intended use.

One certain folding type planting implement includes a single implement tool bar centrally mounted for pivotal movement on a wheel supported carrier platform where the single arm is pivotable about the mount so that half of the bar extends over the tongue assembly and is a supportable thereby and the other half of the bar extends away from the tractor behind the chassis. The tongue assembly has to be long enough to accommodate the implement bar length plus some clearance assembly to allow a tractor linked to the tongue to turn left and right. For example, where the planting implement operating width is 40-feet, the tongue assembly generally has to be greater than 20-feet long.

To ensure planting along the entire edge of a field, a farmer typically starts seeding the field by first traveling around the edge of the field with a seeding implement at lease once and often two or more times along adjacent consecutively smaller paths prior to traveling in parallel rows through field. These field edge paths are generally referred to in the industry as headland passes. Performing one or more headland passes about a field edge prior to performing parallel passes provides a space for turning the tractor an implement around between parallel passes while still covering the entire space along the field edge. However, headland passes include driving over field sections that have already been seeded, crushing the seeds or growing plants that pass over and reducing overall field production. As known in the industry, farms routinely attempt to reduce the number of headland passes required in a field.

The number of headland passes required to facilitate field coverage is related to the turning radius of a tractor and planter implement combination and the combination turning radius is directly related to the length of the tongue assembly coupling the planting implement with the tractor. Recognizing that a short tongue during planting implement operation reduces the number of headland passes and increases efficiency, and a long tongue is desirable to accommodate pivotal and scissors type implement configurations, the industry has developed telescoping tongue assembly driven by a hydraulic cylinder to extend and accommodate implement transport, and to retract and provide a minimal turning radius during operation.

Typically, planting implements do not come equipped with their own power units. Most farmers employ many different implements, and a separate power unit for each implement would be too costly. Instead, tractors are typically constructed with power capacities sufficient to transport an implement as well as provide power to operate the implement. In particular, a tractor in tow of a planting implement would provide hydraulic fluid to power any cylinders required to rotate the implement between transport and functional positions, to raise and lower support wheels, to raise and lower an implement tool bar, to extend and retreat the telescopic tongue assembly and to control the hydraulic locking assemblies. In addition, the tractor would also provide electrical power to the hydraulic valves (e.g., solenoid valves), any blower mechanisms for product conveyance to the row metering units and to any other devices requiring electrical power (e.g., tail lights, sensors, etc.).

To provide power to the planting implement, a tractor typically comes equipped with one or, in most cases, a plurality of power or power source ports are positioned proximate a hitch receiving assembly of the tow vehicle, and the planting implement is equipped with one or more power receiving ports. Power cables are then provided to link associated ports (i.e., hydraulic to hydraulic, electrical to electrical, etc.) together. Generally, the planting implement pivots about the hitch receiver assembly with respect to the tractor and therefore the power cables are constructed to flex and accommodate a degree of pivoting consistent with a minimum tractor turning radius.

As with most assemblies that include flexible lines, e.g., hydraulic hoses, electrical harnesses, pneumatic lines, power cables, etc., the flexible lines of the planting implement need to be protected from damage. Otherwise, for example, a severed hydraulic fluid line can prevent the planting implement from being rotated to a suitable position for transportation along most roadways. Protecting the hydraulic hoses is particularly difficult with telescoping tongue assemblies.

U.S. Pat. No. 6,561,535 discloses an agricultural implement employing a sheath member mounted to the tongue assembly to receive power cables from the tractor. The sheath member defines a passageway that restricts bending in the power cables to a single plane. However, when the toolbar planter was folded into and out of transport, the hoses drop down and drag on the toolbar deck. This wear and tear on the flexible lines will increase a potential for failure over time.

There is thus a need for a holder assembly that minimizes wear and tear on the flexible lines associated with operation of an implement, and yet positions the flexible lines correctly during telescopic movement of the tongue assembly and/or pivoting/rotating movement of the tool bar assembly between transport and operation of the agricultural implement.

SUMMARY OF THE INVENTION

The present invention provides a holder assembly configured to receive at least one flexible line. The holder assembly includes a first pivotally coupled link in general alignment with a second pivotally coupled link, and at least one post pivotally coupled between the first pivotally coupled link and the second pivotally coupled link. The holder assembly further includes a bracket connected at the at least one post. The bracket is configured to receive the at least one hose between the bracket and the post.

In a preferred embodiment of the holder assembly, the bracket includes a plate structure having a first angled end opposite a second angled end and a main body therebetween. The main body of the plate structure includes an opening generally located centrally between the first and second angled ends. The opening is configured to receive a fastener therethrough coupling the bracket to the post. The post includes a plate structure having a first end and a second end and a body portion therebetween. The first end of the post includes a rectangular cross-sectional shape with a first width and the body portion having a second width that is greater than the first width of the first end. The second end of the post includes a rounded cross-sectional shape of a diameter less than the second width of the body portion. The first pivotally coupled link includes a first opening to receive the first end and the body portion of the post therethrough. The second pivotally coupled link includes a second opening to receive the second end of the post. The second opening of the second pivotally coupled link is of a diameter less than the second width of the body portion of the post. The first pivotally coupled link and the second pivotally coupled link each include a generally flat, elongated plate structure. The main body of the pivot link includes a first clamp opening and the clamp includes a second clamp opening. The preferred holder assembly further includes a fastener received in the first clamp opening of the pivot link and the second clamp opening of the clamp, the fastener connecting the pivot link with the clamp. A first end of the first pivotally coupled link and a first end of the second pivotally coupled link each includes an opening to receive a shaft configured to pivotally support the holder assembly.

In another embodiment, the present invention provides an agricultural implement that includes a frame assembly having a telescoping tongue assembly, and at least one flexible line extending along the telescoping tongue assembly, the at least one flexible line associated with operation of the agricultural implement. The agricultural implement further includes a holding assembly in support of the at least one flexible line on the frame assembly of the agricultural implement. The holder assembly includes a first pivotally coupled link in general parallel alignment with a second pivotally coupled link, and at least one post pivotally interconnected between the first pivotally coupled link and the second pivotally coupled link. The holder assembly further includes a bracket connected at the post and configured to receive the at least one flexible line between the bracket and the post.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 3 illustrates a detailed top view of the constraint assembly in support of a series of flexible lines on the telescoping tongue assembly of FIG. 1, the tongue assembly in a retracted position.

FIG. 4 illustrates a detailed top view of the constraint assembly in support of a series of flexible lines on the telescoping tongue assembly of FIG. 1, the tongue assembly in an intermediary position.

FIG. 5 illustrates a detailed top view of the constraint assembly in support of a series of flexible lines on the telescoping tongue assembly of FIG. 2.

FIG. 6 illustrates a detailed side elevation view of the constraint assembly mounted on the telescoping tongue assembly of FIG. 2.

DETAILED DESCRIPTION OF THE PREFERRED EMBODIMENTS

Figure 1:
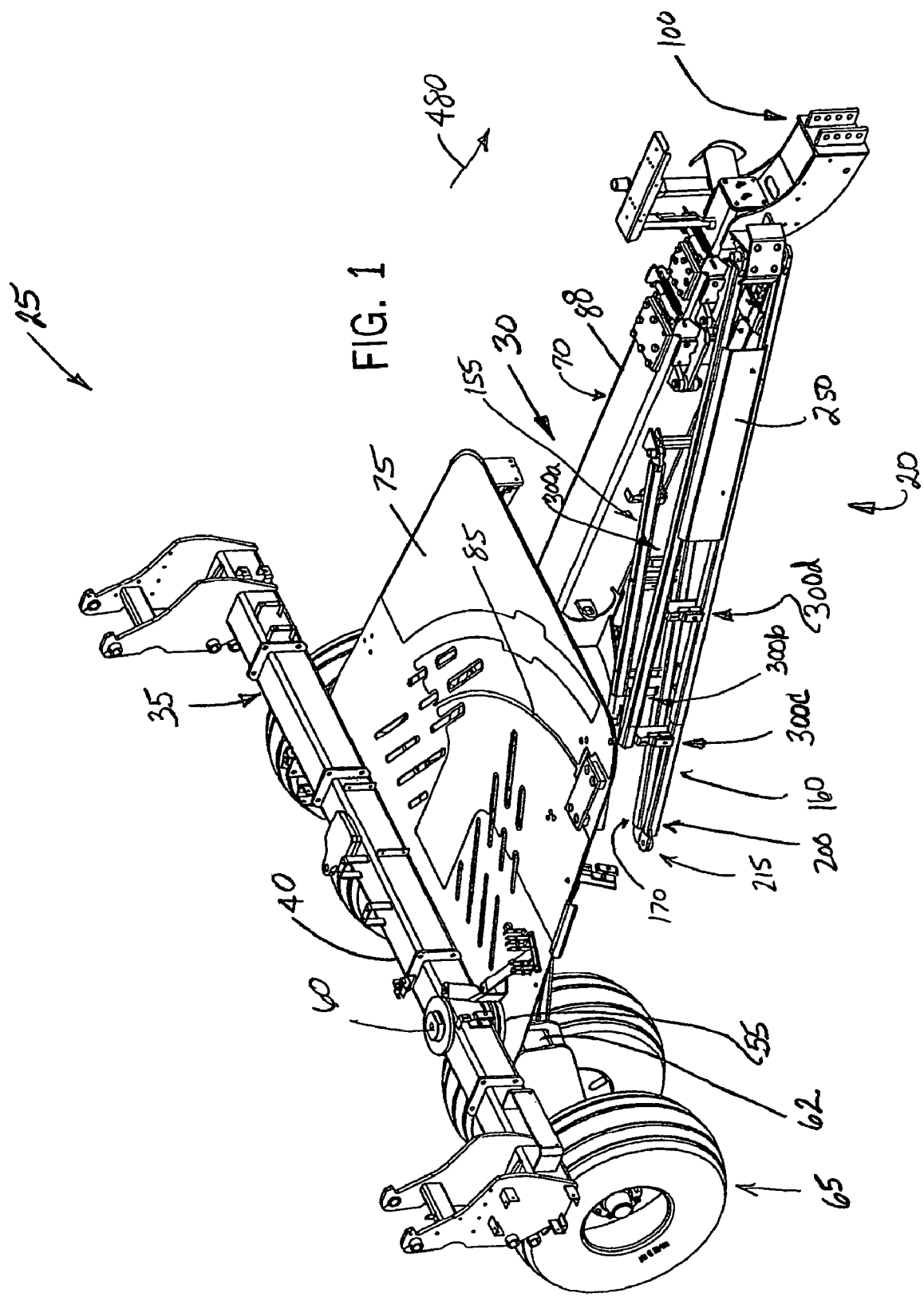
FIG. 1 illustrates an isometric view of a constraint assembly in combination with a series of holder assemblies in accordance with the present invention mounted on an agricultural implement having a telescoping tongue assembly, the tongue assembly in a retracted position.
Figure 2:
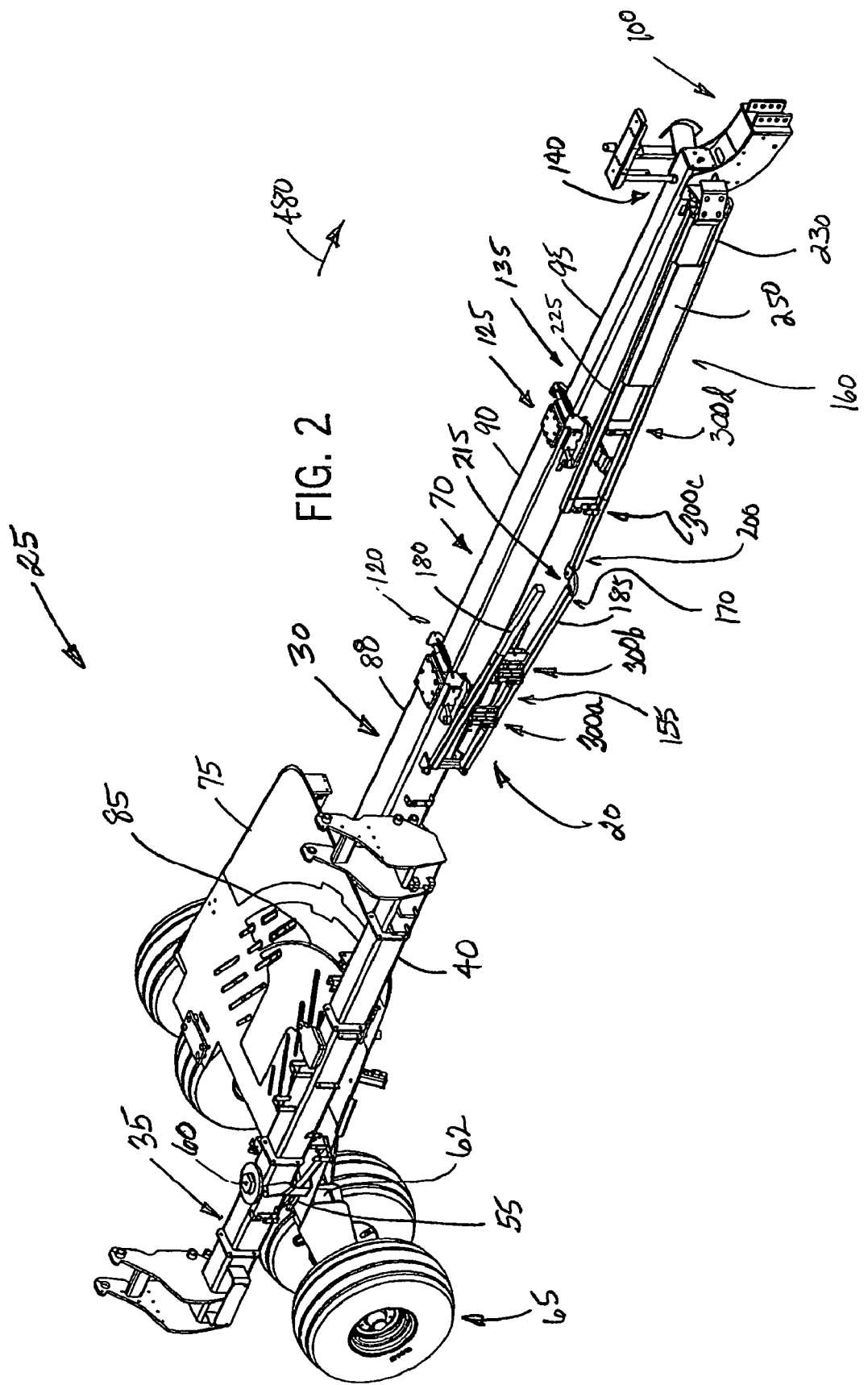
FIG. 2 illustrates an isometric view of the agricultural implement of FIG. 1, the telescoping tongue assembly in an extended position.

FIGS. 1 and 2 illustrate a constraint assembly 20 in combination with a frame assembly 25 of an agricultural implement in accordance with the present invention. The preferred agricultural implement is a planting implement as described in U.S. Pat. No. 6,663,134 entitled "Planter Hitch Apparatus," filed Jan. 31, 2002, and hereby incorporated herein by reference in its entirety.

As illustrated in FIGS. 1 and 2, the frame assembly 25 of the preferred planting implement generally includes a carrier frame assembly 30, a main frame assembly 35 and an implement assembly (not shown). As its label implies, the carrier frame assembly 30 generally includes components configured to facilitate transport or carrying of the main frame assembly 35 and the implement assembly (not shown). Similarly, as their labels imply, the main frame assembly 35 generally includes components configured to support any of several different implement assemblies. The implement assembly (not shown) includes components (e.g., planting devices) configured in a known manner to carry out a specific agricultural processes corresponding to a specific agricultural implement. For instance, the components that comprise the implement assembly may be used for tilling, fertilizing, planting, etc. The main frame assembly 35 is mounted to the carrier frame assembly 30 and the implement assembly (not shown) is mounted to the main frame assembly 35. The present invention generally resides in the carrier frame assembly 30 and, more particularly, in the tongue or hitch assembly (discussed later) that forms part of the carrier frame assembly 30. For this reason, the implement assembly and the main frame assembly 35 are described in minimal detail and thereafter carrier frame assembly 30 is described in greater detail.

Still referring to FIGS. 1 and 2, the main frame assembly 35 generally includes, among other components, a main frame bar member 40, a latching assembly (not shown) and a pivot plate 55. Pivot plate 55 is mounted to an undersurface of the main frame bar 40 about one-fourth the length of the main frame bar 40 from a first end thereof and forms a downwardly opening pivot receiving aperture (not observable in the FIGS. 1 and 2) for receiving a pivot pin 60 of the carrier frame assembly 30. A latch assembly (not shown) cooperates with the carrier frame assembly 30 to lock the main frame assembly 35 in either an operating position (see FIG. 1) or a transport position (see FIG. 2).

Referring to FIGS. 1 and 2, the carrier frame assembly 30 generally includes a cross bar 62, wheel assemblies 65, a telescoping tongue assembly 70 and a platform 75. The preferable telescoping tongue assembly 70 is a two stage assembly and is described in more detail later. The platform 75 is essentially a rigid flat bed member that is secured to a top surface of the cross bar 62. Among other features, the platform 75 forms a track runner 85 on a top surface. Pivot pin 60 extends through an opening in the platform 75.

Still referring to FIGS. 1 and 2, the track runner 85 forms an arc about the pivot pin 60. The track runner 85 is dimensioned so as to securely support the main frame bar 40 thereabove. The entire main frame bar 40 and components attached thereto (not shown) are moveable between the transport position illustrated in FIG. 2 to the operating position illustrated in FIG. 1 and to any intermediate position therebetween by simply rotating the main frame bar 40 about the pivot pin 60. As indicated above, when in either the transport or operating positions, the latch assembly cooperates to lock the main frame bar 40 to the carrier assembly 30 in a manner that reduces movement during transport. Any means for rotating the main frame bar 40 about the pin 60 may be employed.

The main frame assembly 35 and the cross bar 62 are shown in the operating position illustrated in FIG. 1, consistent with reducing the number of required headland passes needed to perform an agricultural task for an entire field. However, as FIG. 2 illustrates, in order to accommodate a long configuration of the main frame assembly 35 in the transport position (FIG. 2), the telescoping tongue assembly 70 has to be extended.

Referring now to FIGS. 1–4, the exemplary telescoping tongue assembly 70 generally includes a first tongue arm 88, a second tongue arm 90, and a third tongue arm 95, a hitch assembly 100, and first hydraulic tongue cylinder 105, and a second interior hydraulic tongue cylinder (not shown) located in the interior of the third tongue arm 95, respectively.

The second tongue arm 90 has first and second ends 120 and 125, and the third tongue arm 95 has first and second ends 135 and 140. The hitch assembly 100 is secured to the second end 140 of third tongue member 95. The exemplary first, second, and third tongue arms 88, 90 and 95, respectively, are tubular shaped and of dimension such that the third tongue arm 95 received within the second tongue arm 90 with minimal clearance, and the second tongue arm 90 is dimensioned to be received with minimal clearance within the first tongue arm 88. It should also be appreciated that additional stages may be added to the tongue assembly 70 by providing additional arms and associated hydraulic cylinders to the tongue assembly 70.

Assuming that tongue assembly 70 is locked in a completely retracted position (FIG. 1), in order to unlock the latch assemblies and extend the tongue assembly 70, hydraulic fluid is pumped from a hydraulic source at a tow vehicle (not shown) in a known manner to extend the telescoping tongue assembly 70. The pumped hydraulic fluid causes the first hydraulic cylinder 105 (See FIGS. 3 and 5) and the second enclosed cylinder (not shown) to extend and drive corresponding tongue arms 90 and 95 toward extended positions as illustrated in FIGS. 2 and 5.

Figures 3, 4:
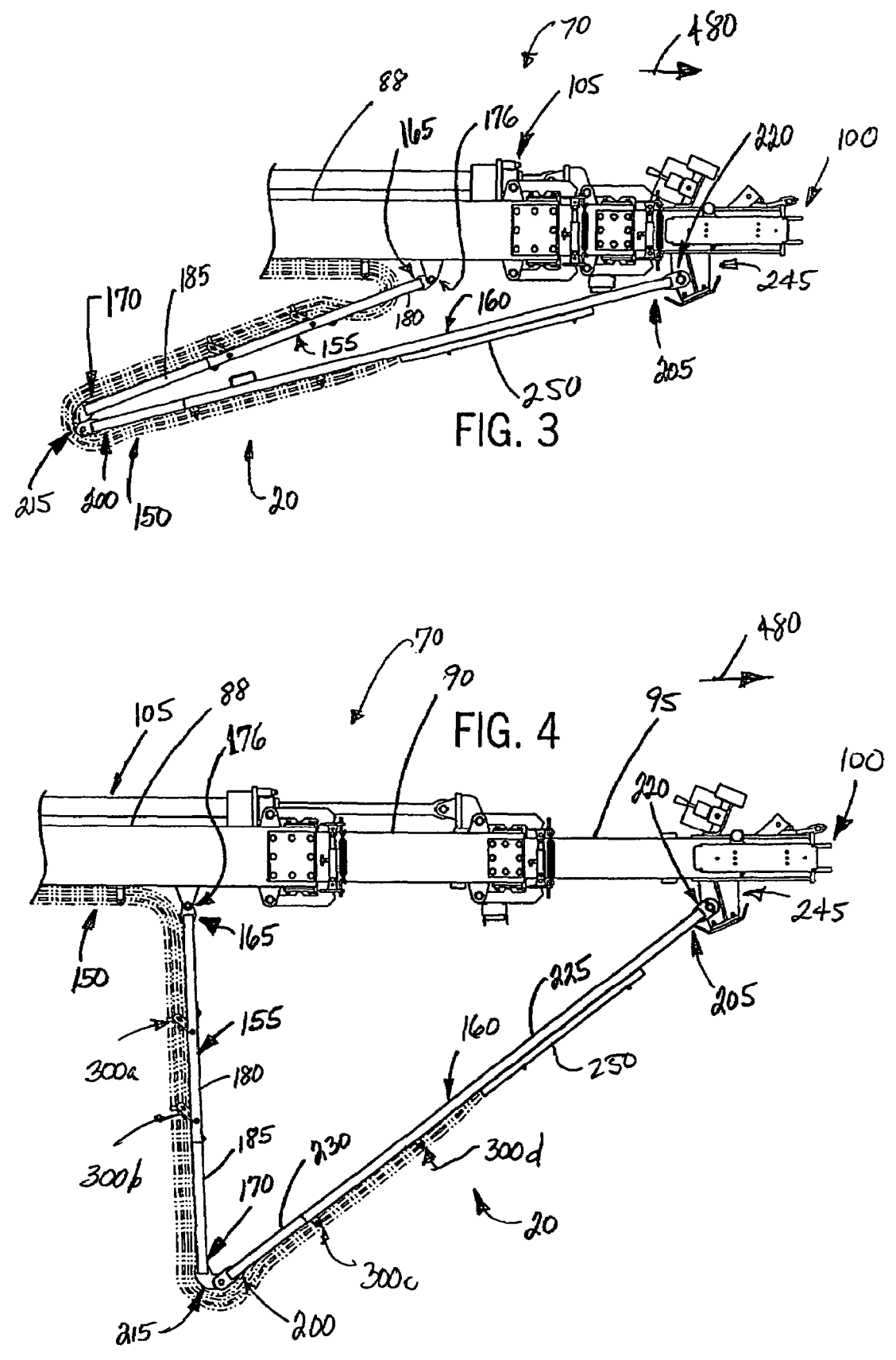

Referring to FIGS. 3–5, the constraint assembly 20 is generally configured to secure and to support a series of flexible lines 150, e.g., hoses, cables, harnesses, etc., associated with operation of the planting implement. The series of flexible lines 150 (illustrated in dashed lines) preferably extend along the tongue assembly 70 of the implement. The series of flexible lines 150 (e.g., hoses, electrical harness, electrical cables, etc.) are connected to various types of mechanisms (e.g., electrical, hydraulic, pneumatic, etc.) or sensors (not shown) associated with miscellaneous operations of the implement but not shown for clarity. As the telescoping tongue assembly 70 moves between the retracted position (FIG. 3) and the extended position (FIG. 5), the constraint assembly 20 pivots inward and outward in a manner that takes-up slack developed in the series of flexible lines 150.

Referring to FIGS. 3–6, the preferred constraint assembly 20 generally includes a first linkage 155 pivotally coupled with a second linkage 160 between the first hitch arm and the third hitch arm of the hitch assembly.

Figure 7:
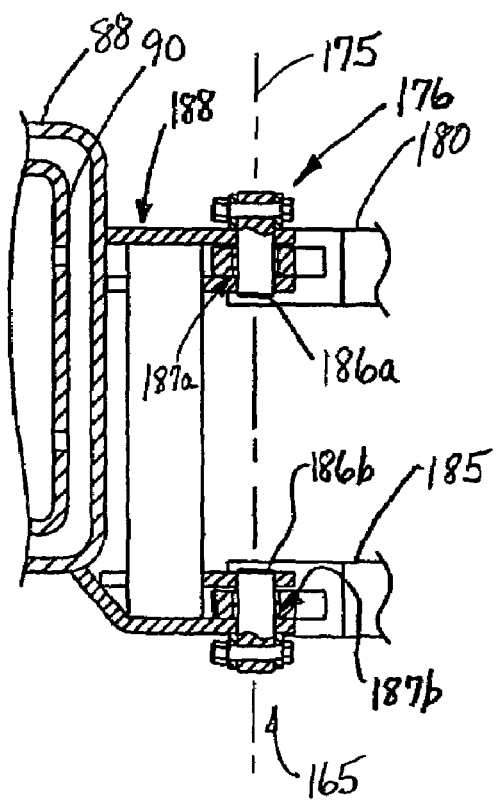
FIG. 7 illustrates a cross-sectional view of the constraint assembly along line 7—7 in FIG. 6.

As illustrated in FIGS. 3–7, the preferred first linkage 155 includes a first end 165 and a second end 170. The first end 165 of the first linkage 155 is pivotally coupled about a vertical axis 175 (See FIGS. 6 and 7) of a pivotal coupling assembly 176 to the first tongue arm 88 of the telescoping assembly 70 of the planting implement. The preferred first linkage 155 includes a first arm 180 in general parallel relation to a second arm 185. The illustrated first arm 180 is shorter in length relative to the length of the second arm 185, but the length of the arms 180 and 185 can vary. The preferred type of first and second arms 180 and 185 are tubular-shaped and can vary in cross-sectional shape (e.g., square, circular, etc.), but the type (e.g., flat bars, t-beams, etc.) of arms 180 and 185 can vary. Referring to FIG. 7, the illustrated ends 165 of each of the first and second arms 180 and 185 is generally flat, plate-shaped and includes openings 186a and 186b. The preferred pivot coupling assembly 176 generally includes pivot pins 187a and 187b extending through the openings 186a and 186b in the first and second arms 180 and 185, respectively, and coupling the first linkage 160 to a bracket assembly 188 fixed at the first telescoping arm 88.

Figure 8:
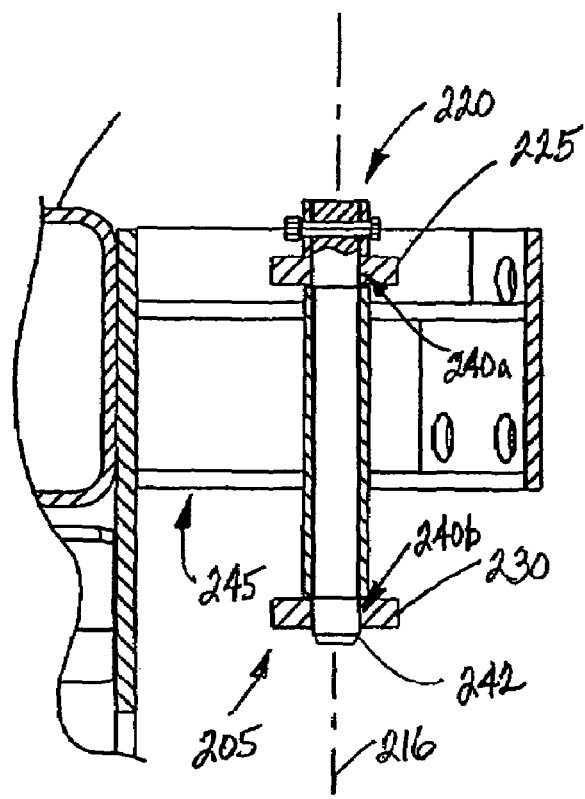
FIG. 8 illustrates a cross-sectional view of the constraint assembly along line 8—8 in FIG. 6.

As illustrated in FIGS. 3–6 and 8, the second linkage 160 includes a first end 200 and a second end 205. The first end 200 of the second linkage 160 is pivotally connected by a pivot coupling 215 to the second end 170 of the first linkage 155. The second end 205 of the second linkage 160 is pivotally coupled about a vertical axis 216 (See FIGS. 6 and 8) of pivot coupling 220 to the third tongue arm 95 of the tongue assembly 70. The preferred second linkage 160 includes a first arm 225 in general parallel relation to a second arm 230, and the ends 205 of each of the first and second ends 225 and 230 are generally flat, plate-shaped and include openings 240a and 240b FIG. 8), similar to the first linkage 155 described above. Referring to FIG. 8, the preferred pivot coupling 220 generally includes a pivot pin 242 received through the openings 240a and 240b in the first and second arms 225 and 230, respectively, and coupling the second linkage 160 to a bracket assembly 245 fixed at the third tongue arm 95.

Referring to FIGS. 1–6, the preferred constraint assembly 20 can further include one or more guards 250 located along the length of and connected between the first and second arms 225 and 230, respectively, of the second linkage 160. The guards 250 are generally configured and positioned to protect the flexible lines 150 from wear and tear associated with operation of the planting implement. The preferred guard 250 is generally trapezoidal-shaped plate and mounted outward relative to the first and second arms of the second linkage. Although FIGS. 1–6 illustrate only one guard 250 mounted on the second linkage, it is understood that other guards can be mounted to the first and second linkages 155 and 160 of the constraint assembly 20.

Although the first and second linkages 155 and 160 are shown pivotally coupled about vertical axes 175 (FIG. 7) and 216 (FIG. 8) with the first and third tongue arms 88 and 90, respectively, the orientation of the pivot axes (e.g., vertical, horizontal) of the constraint assembly 20 can vary. In addition, the constraint assembly 20 can be mounted on either side of the tongue assembly 70. Also, although the first linkage 155 is illustrated with a first arm 180 and a second arm 185 and the second linkage 160 is illustrated with a first arm 225 and a second arm 230, the first and second linkages 155 and 160 can be comprised of a various number and type (e.g., plates, solid bars, beams, tubes, etc.) of construction, as well as materials of composition (e.g., steel, iron, aluminum, plastic, etc.) and is not limiting on the invention.

As illustrated in FIGS. 3–5, the constraint assembly 20 employs a series of holder assemblies 300a–d to secure the series of flexible lines 150 to the constraint assembly 20. Each of the holder assemblies 300a–d is attached between the first and second arms 180 and 185 of the first linkage 155 and the first and second arms 225 and 230 of the second linkage 160. The exemplary constraint assembly 20 employs four holder assemblies 300a, 300b, 300c, and 300d. The constraint assembly 20 in combination with the series of holder assemblies 300a–d secure the flexible lines 150 to the frame assembly 25 of the implement in a manner such that the flexible lines 150 have less opportunity to kink or undergo undesired wear and tear associated with movement of the telescoping tongue assembly 70 and/or operation of the implement. The number of flexible lines 150 and the number and location of the holder assemblies 300 receiving the flexible lines 150 can vary.

Figure 9:
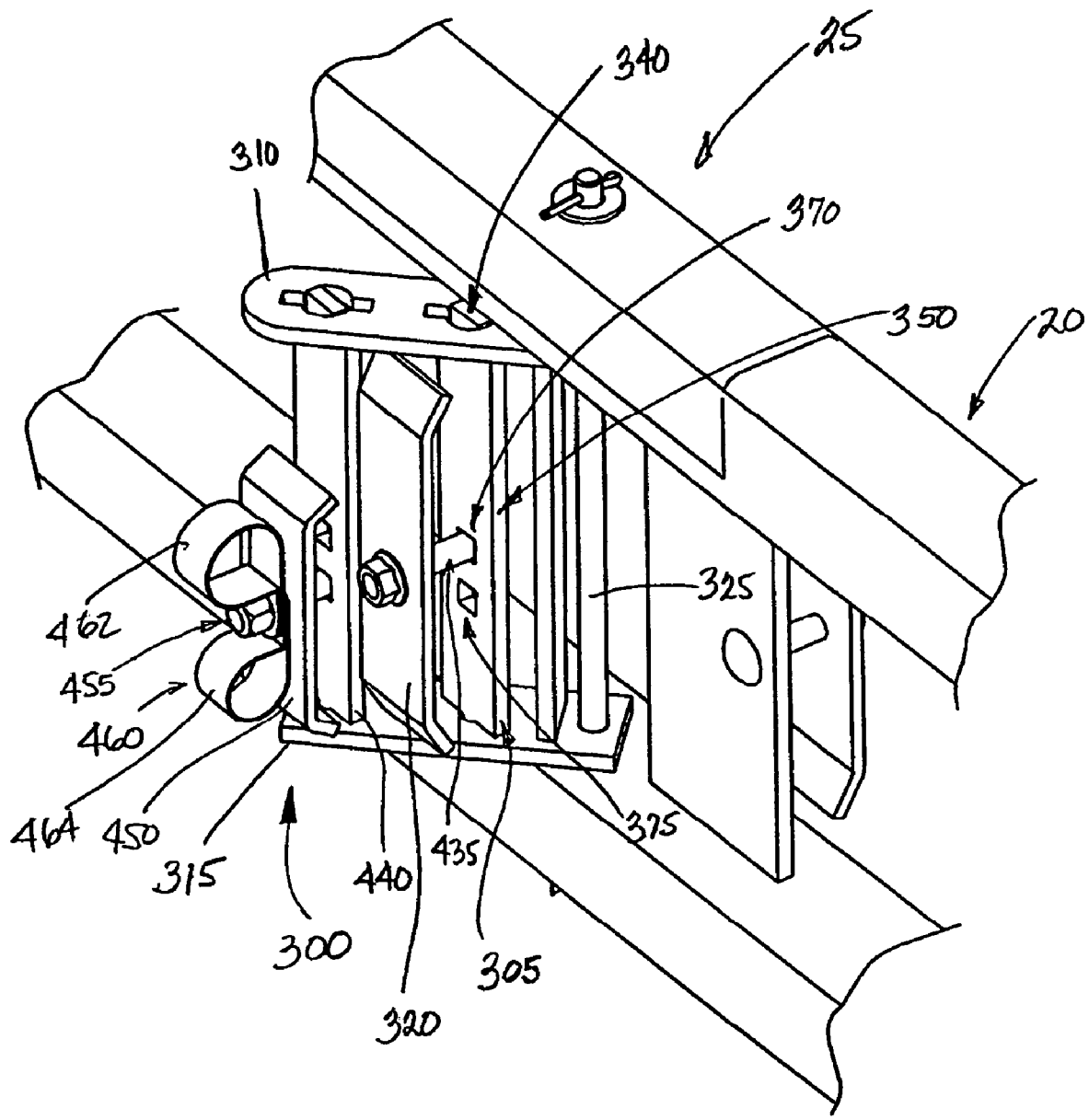
FIG. 9 illustrates a detailed isometric view of the holder assembly in accordance with the present invention mounted on the constraint assembly of FIG. 9.
Figure 10:
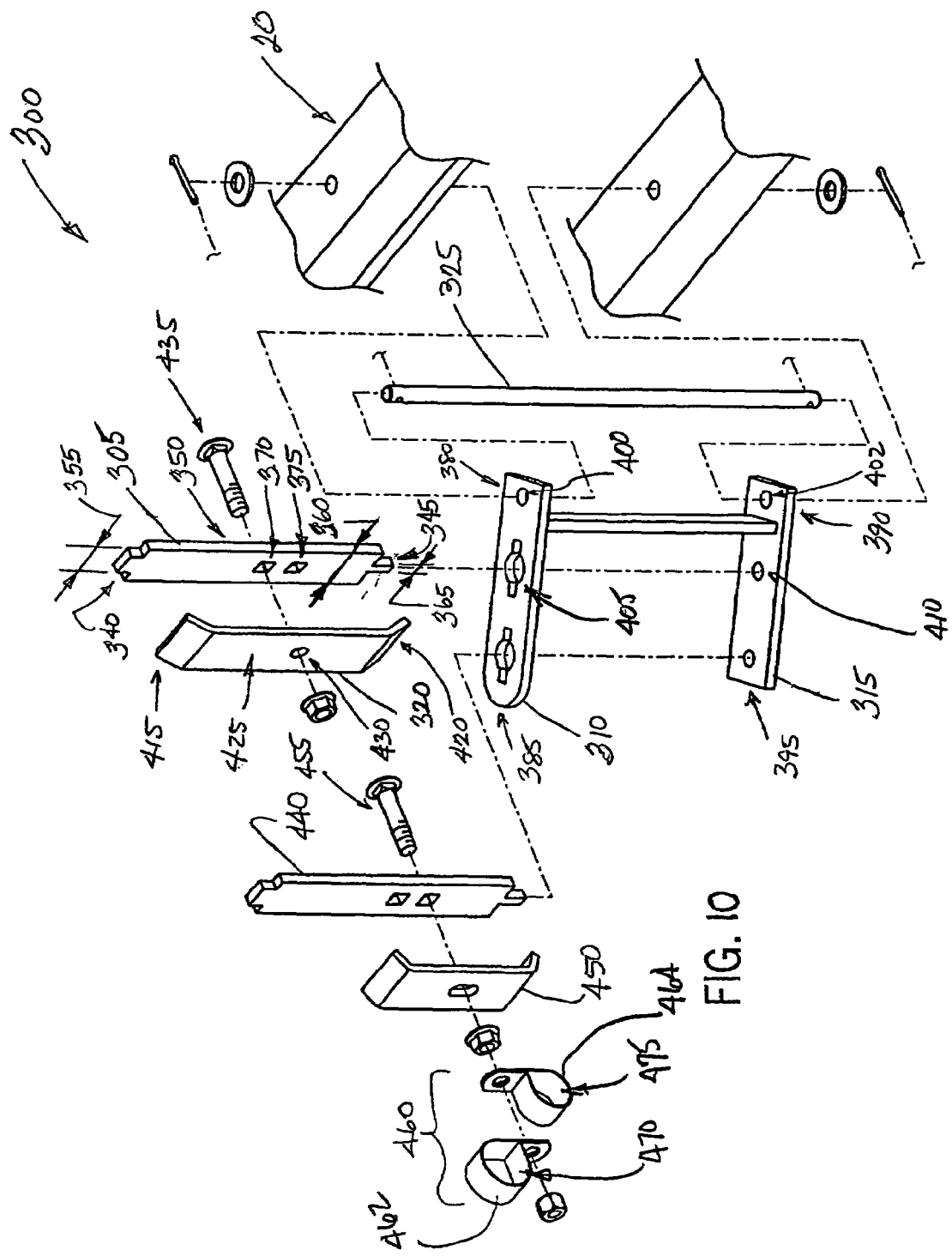
FIG. 10 illustrates an exploded isometric view of the holder assembly shown in FIG. 9.

The holder assemblies 300a–d are generally identical to one another and are therefore generally referred to as the holder assembly 300 in the following description of FIGS. 9 and 10. FIGS. 9 and 10 illustrate a preferred embodiment of the holder assembly 300. The exemplary holder assembly 300 generally includes at least one post 305, and a first pivotally coupled link 310 in general parallel alignment with a second pivotally coupled link 315. The at least one post 305 is pivotally interconnected between the first pivotally coupled link 310 and the second pivotally coupled link 315. The holder assembly 300 further includes a bracket 320 connected at the at least one post 305 and configured to receive at least one of the series of flexible lines 150 (See FIGS. 3–5) between the bracket 320 and the post 305. The holder assembly 300 further includes a shaft 325 pivotally coupling the holder assembly 300 to the constraint assembly 20.

As illustrated in FIG. 10, the exemplary post 305 includes a first end 340 and a second end 345 and a body portion 350 therebetween. The first end 340 of the post 305 generally includes a rectangular cross-sectional shape with a first width 355. The body portion 350 of the post 305 generally includes a second width 360 that is greater than the first width 355 of the first end 340 of the post 305. The second end 345 of the post 305 generally includes a polygonal cross-sectional shape of a diameter or width 365 that is less than the second width 360 of the body portion 350 of the post 305. The post 305 further includes a first opening 370 and a second opening 375 through the body portion 350 of the post 305. The exemplary openings 370 and 375 are polygonal-shaped, but the shaped of the openings 370 and 375 can vary. The posts 305 are generally configured and have first and second openings 370 and 375 that are generally aligned and of the same size such that the posts 305 are interchangeable, but the dimension, alignment and relative size of the posts 305 can vary.

Still referring to FIG. 10, the preferred first and second pivotally coupled links 310 and 315 include a generally flat, elongated plate structure. The first pivotally coupled link 310 includes a first end 380 and a second end 385. The second pivotally coupled link 315 includes a first end 390 and a second end 395. The first end of the first pivotally coupled link 310 includes a first shaft opening 400 and the first end 390 of the second pivotally coupled link 315 includes a second shaft opening 402 that together receive the shaft 325 therethrough pivotally supporting the holder assembly 300 to the constraint assembly 20. The first pivotally coupled link 310 further includes at least one post opening 405 to receive the first and second ends 340 and 345 and the body portion 350 of the post 305 therethrough, and the second pivotally coupled link 315 further includes a second post opening 410 to receive the second end 345 of the post 305 therethrough. The first post opening 405 is of a diameter so as to allow the first end 340 of the post 305 to rotate. The second post opening 410 of the second pivotally coupled link 315 is generally of a diameter less than the second width 360 of the body portion 350 of the post 305 so as to retain the post 305 between the first and second pivotally coupled links 310 and 315.

The first bracket 320 includes a plate structure having a first angled end 415 opposite a second angled end 420 and a main body portion 425 therebetween. The main body portion 425 of the bracket 320 includes an opening 430 generally located centrally between the first and second angled ends 415 and 420. A fastener 435 (e.g., bolt and nut) is received in the opening 430 of the bracket 320 and the opening 370 of the post 305.

The holder assembly can further include a second post 440 of similar construction and dimension and attached to the first and second pivotally coupled links 310 and 315, in similar manner as the post 305 described above. The holder assembly 300 can further include a second bracket 450 coupled to the second post 440 in a similar manner as described for bracket 320. The second bracket 450 and second post 320 are generally located at the second ends 385 and 395 of the first and second pivotally coupled links 310 and 315, respectively, and opposite the shaft 325. The exemplary second bracket 450 generally includes a plate structure similar in construction to the first bracket 320 described above, except shorter in length. The second bracket 450 is connected by a fastener 455 to the second post 440 in a manner similar to the first bracket 320 described above so as to secure one or more of the series of flexible lines 150 (See FIGS. 3–5) therebetween.

A hose coupling 460 is attached by the fastener 455 to the second bracket 450. The exemplary hose coupling 460 generally includes two plate structures 462 and 464 having curvilinear-shapes that define a first opening 470 and a second opening 475. Each first and second opening 470 and 475 of the hose coupling 460 is configured to receive one or more of the series of flexible lines 150 therethrough, thereby providing an additional means of supporting the flexible lines 150 in a manner that also segregates one or more flexible lines 150 in an order or position from others in the series of flexible lines 150 associated with the implement.

In operation, the constraint assembly 20 supports the series of flexible lines 150 (e.g., hoses, electrical cables, harnesses, etc.) associated with operation of the planting implement. The series of flexible lines 150 are attached to the constraint assembly 20 by a series of holder assemblies 300a–d. The constraint assembly 20 is pivotally coupled between the first tongue arm 88 and the third tongue arm 95 of the telescoping tongue assembly 70. In the retracted, field operative position of the tongue assembly 70 (FIGS. 1 and 3), the first linkage 155 and the second linkage 160 of the constraint assembly 20 fold in a generally rearward direction relative to a forward direction of travel, (illustrated by arrow 480) and below the platform 75 of the carrier assembly 30. As the constraint assembly 20 moves from the field operative position (FIGS. 1 and 3) to the intermediate position (FIG. 4), the second end 170 of the first linkage 155 and the first end 200 of the second linkage 160 and the pivot coupling 215 therebetween generally swings outward from the tongue assembly 70. In the extended transportation position (FIGS. 2 and 5) of the telescoping tongue assembly 70, the first linkage 155 and the second linkage 160 are generally extended along the length of and aligned generally parallel to the first, second and third hitch arms 88, 90 and 95 of the tongue assembly 70.

The series of the flexible lines 150 associated with the miscellaneous mechanisms of the implement are restrained by the series of holder assemblies 300a–d mounted to the constraint assembly 20. Each of the holder assemblies 300a–d is operable to independently pivot about a vertically aligned shaft coupled to the constraint assembly 20 so as to restrain the series of flexible lines 150 in an side-to-side manner along a horizontal plane relative to the tongue assembly 70 as the implement moves in the forward direction of travel 480. Each bracket 320 and 450 receives one or more of the series of flexible lines against an associated post 305 and 440 attached thereto in a manner that secures the flexible lines 150 to the holder assembly 300. The hose coupling 460 is also provided to provide an additional means to support and segregate one or more flexible lines 150 from the others in the series of flexible lines 150 secured by the holder assembly 300. Each holder assembly 300 reduces wear and tear on and snagging opportunities associated with slack in the flexible lines 155 during transport or operation of the implement in the field. Each of the brackets 320 and 450 can be readily attached with and detached from the holder assembly 300 to accommodate various sizes and numbers of flexible lines 150.

The constraint assembly 20 in combination with the series of holder assemblies 300a–d include minimal moving parts that still allow the flexible lines 150 to move with the telescoping tongue assembly 70. The constraint assembly 20 also folds to a compact field position so as to minimize obstruction of the operator's field of view and to provide adequate clearance from the ground surface when the operating the planting implement in the field.

Although the exemplary series of holder assemblies 300 a–d are located to secure the flexible lines 150 to the constraint assembly 20, the use of the holder assemblies 300 is not limited in this manner. For example, one or more holder assemblies 300 can be located support or more of the flexible lines 150 at various locations along the frame assembly 25 of the implement and is not limiting on the invention.

Many changes and modifications could be made to the invention without departing from the spirit thereof. The scope of these changes will become apparent from the appended claims.

We claim:

1. A holder assembly configured to receive at least one flexible line, comprising:
    a first pivotally coupled link in general alignment with a second pivotally coupled link;
    at least one post pivotally coupled between the first pivotally coupled link and the second pivotally coupled link; and
    a bracket connected at the post, wherein the bracket receives the at least one flexible line between the bracket and the post, wherein the post includes a plate structure having a first end and a second end and a body portion therebetween, the first end of the post having a rectangular cross-sectional shape with a first width and the body portion having a second width that is greater than the first width of the first end, and wherein the second end of the post has a rounded cross-sectional shape of a diameter less than the second width of the body portion.

2. The holder assembly as recited in claim 1, wherein the bracket includes a plate structure having a first angled end opposite a second angled end and a main body therebetween, and wherein the main body of the plate structure includes an opening generally located centrally between the first and second angled ends, the opening for receiving a fastener therethrough coupling the bracket to the post.

3. The holder assembly as recited in claim 1, wherein the first pivotally coupled link includes a first opening to receive the first end and the body portion of the post therethrough.

4. The holder assembly as recited in claim 1, wherein the second pivotally coupled link includes a second opening to receive the second end of the post.

5. A holder assembly as recited in claim 4, wherein the second opening of the second pivotally coupled link is of a diameter less than the second width of the body portion of the post.

6. The holder assembly as recited in claim 1, wherein the first pivotally coupled link and the second pivotally coupled link each include a generally flat, elongated plate structure.

7. The holder assembly as recited in claim 1, wherein a first end of the first pivotally coupled link and a first end of the second pivotally coupled link each includes an opening to receive a shaft configured to pivotally support the holder assembly.

8. An agricultural implement, comprising:
a frame assembly having a telescoping tongue assembly,
at least one flexible line extending along the telescoping tongue assembly, the at least one flexible line associated with operation of the agricultural implement;
a holder assembly in support of the at least one flexible line on the frame assembly of the agricultural implement, comprising:
a first pivotally coupled link in general parallel alignment with a second pivotally coupled link;
at least one post pivotally interconnected between the first pivotally coupled link and the second pivotally coupled link; and
a bracket connected at the post, wherein the bracket receives the at least one flexible line between the bracket and the post,
wherein the telescoping tongue assembly includes a first arm and a second arm in telescoping relation to the first arm, and further including a pivotal constraint assembly pivotally intercoupled at each end about a vertical axis between and relative to the first and second arms of the telescoping tongue assembly, respectively, and wherein the holder assembly is mounted on the constraint assembly,
wherein the post includes a plate structure having a first end and a second end and a body portion therebetween, wherein the first end includes a rectangular cross-sectional shape having a first width, wherein the body portion has a second width that is greater than the first width of the first end of the post, wherein the second end has a rounded cross-sectional shape having a diameter less than the second width of the body portion.

9. The agricultural implement as recited in claim 8, wherein the first pivotally coupled link includes a first opening to receive the first end of the post.

10. The agricultural implement as recited in claim 8, wherein the second pivotally coupled link includes a second opening to receive the second end of the post.

11. The agricultural implement as recited in claim 10, wherein the second opening in the second pivotally coupled link is generally circular shaped to receive the second end of the post therethrough.

12. The agricultural implement as recited in claim 8, wherein a first opening in the first pivotally coupled link is configured to receive the second end and the body portion of the post therethrough.

13. The agricultural implement as recited in claim 8, wherein the bracket includes a plate structure having a first angled end and a second angled end and a flat body portion therebetween, wherein the body portion of the bracket includes a first bracket opening and the post includes a first post opening, and further including:
a fastener received in the first bracket opening of the bracket and the first post opening of the post, the fastener coupling the bracket with the post.

* * * * *